(12) United States Patent
Marsili et al.

(10) Patent No.: US 7,606,538 B2
(45) Date of Patent: Oct. 20, 2009

(54) MIXER CIRCUIT AND METHOD

(75) Inventors: Stefano Marsili, Fürnitz (AT); Marc Tiebout, Weßling (DE)

(73) Assignee: Infineon Technologies AG, Munich (DE)

(*) Notice: Subject to any disclaimer, the term of this patent is extended or adjusted under 35 U.S.C. 154(b) by 501 days.

(21) Appl. No.: 11/487,205

(22) Filed: Jul. 14, 2006

(65) Prior Publication Data
US 2008/0013755 A1 Jan. 17, 2008

(51) Int. Cl.
H04B 1/04 (2006.01)
H04B 17/00 (2006.01)
H03C 1/62 (2006.01)

(52) U.S. Cl. .................. 455/114.2; 455/115.2; 455/118
(58) Field of Classification Search .............. 455/114.1, 455/114.2, 115.1, 115.2, 118, 126, 226.1, 455/293, 296, 311, 312, 317
See application file for complete search history.

(56) References Cited

U.S. PATENT DOCUMENTS

| 6,868,279 | B2 * | 3/2005 | Sahlman et al. ............. 455/522 |
| 7,046,980 | B1 | 5/2006 | Manku et al. |
| 7,280,805 | B2 * | 10/2007 | Xu et al. ................... 455/67.11 |
| 2002/0193086 | A1 | 12/2002 | Bauernschmitt et al. |
| 2005/0101269 | A1 * | 5/2005 | Dale et al. ............... 455/115.1 |
| 2006/0182197 | A1 | 8/2006 | Godambe et al. |
| 2007/0123182 | A1 * | 5/2007 | Dekker ..................... 455/114.1 |
| 2008/0026708 | A1 * | 1/2008 | Marsili et al. ............... 455/118 |

FOREIGN PATENT DOCUMENTS

EP 1208651 B1 5/2002
EP 1267484 A1 12/2002

OTHER PUBLICATIONS

"A WiMedia/MBOA-Compliant CMOS RF Transceiver for UWB", Christoph Sandner, Sven Darksen, Dieter Draxelmayr, Staffan Ek, Volcu Filimon, Graham Leach, Stafano Marsili, Denis Matvoev, Koen Mertens, Florian Michl, Hermann Paule, Manfred Punzenberger, Christian Reindl, Raffaele Salerne, Marc Tiebout, Andreas Wiesbauer, Ian Winter and Zisan Zhang, Proceedings of ISSCC 2006, San Francisco, Feb. 2006, 3 pgs.

"A Dual-Antenna Phased-Array UWB Transceiver in 0.18 μm CMOS", Steve Lo, Isaac Sever, Ssu-Pin Ma, Peter Jang, Albert Zou, Chris Arnott, Kalyan Ghatak, Adam Schwartz, Lam Huynh and Thai Nguyen, Proceedings of ISSCC, 2006, San Francisco, Feb. 2006, 3 pgs.

* cited by examiner

*Primary Examiner*—Nguyen Vo
(74) *Attorney, Agent, or Firm*—Eschweiler & Associates, LLC

(57) ABSTRACT

A mixer circuit includes a mixer having input terminals and an output terminal, to provide an output signal by mixing input signals, wherein the mixer exhibits leakage. The circuit also includes a signal generator coupled to one of the input terminals of the mixer to provide a correction signal, an up-conversion mixer coupled to the mixer to provide an up-converted signal by mixing a test signal with the output signal of the mixer, and a down-conversion mixer coupled to the up-conversion mixer to provide a down-converted signal by down-converting the up-converted signal. A signal detector is coupled to the down-conversion mixer and detects a spurious signal in the down-converted signal, the spurious signal indicating the leakage, and a control unit is coupled to the signal detector and the signal generator to control generation of the correction signal depending on the detected spurious signal to compensate the leakage.

25 Claims, 4 Drawing Sheets

MIXER CIRCUIT AND METHOD

FIELD OF THE INVENTION

This invention relates to mixing circuits in general and more particularly to an apparatus comprising a frequency mixer where the effects of mixer leakage are reduced or eliminated. The apparatus may be adapted to be utilized in a radio transmitter design.

BACKGROUND OF THE INVENTION

Radio transmitters usually use mixers to develop radio transmit signals. Mixers typically exhibit a leakage from one of their input terminals into their output terminals. The spurious signals caused by the leakage need to be eliminated or at least reduced so that they do not significantly degrade the spectral purity of the transmitter output.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

A mixer circuit, comprises a frequency mixer, having input terminals and an output terminal, and is configured to provide an output signal by mixing input signals provided at the input terminals, wherein the frequency mixer exhibits a leakage from one of the input terminals into the output terminal. The circuit also comprises a signal generator coupled to one of the input terminals of the frequency mixer, and configured to generate and provide a correction signal thereto. An up-conversion mixer is coupled to the frequency mixer, and is configured to generate an up-converted signal by mixing a test signal with the output signal of the frequency mixer. A down-conversion mixer is coupled to the up-conversion mixer, and is configured to generate a down-converted signal by down-converting the up-converted signal. A signal detector is coupled to the down-conversion mixer, and is configured to detect a spurious signal in the down-converted signal, wherein the spurious signal indicates the leakage. A control unit is coupled to the signal detector and the signal generator, and is configured to control generation of the correction signal depending on the detected spurious signal to compensate for the leakage.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
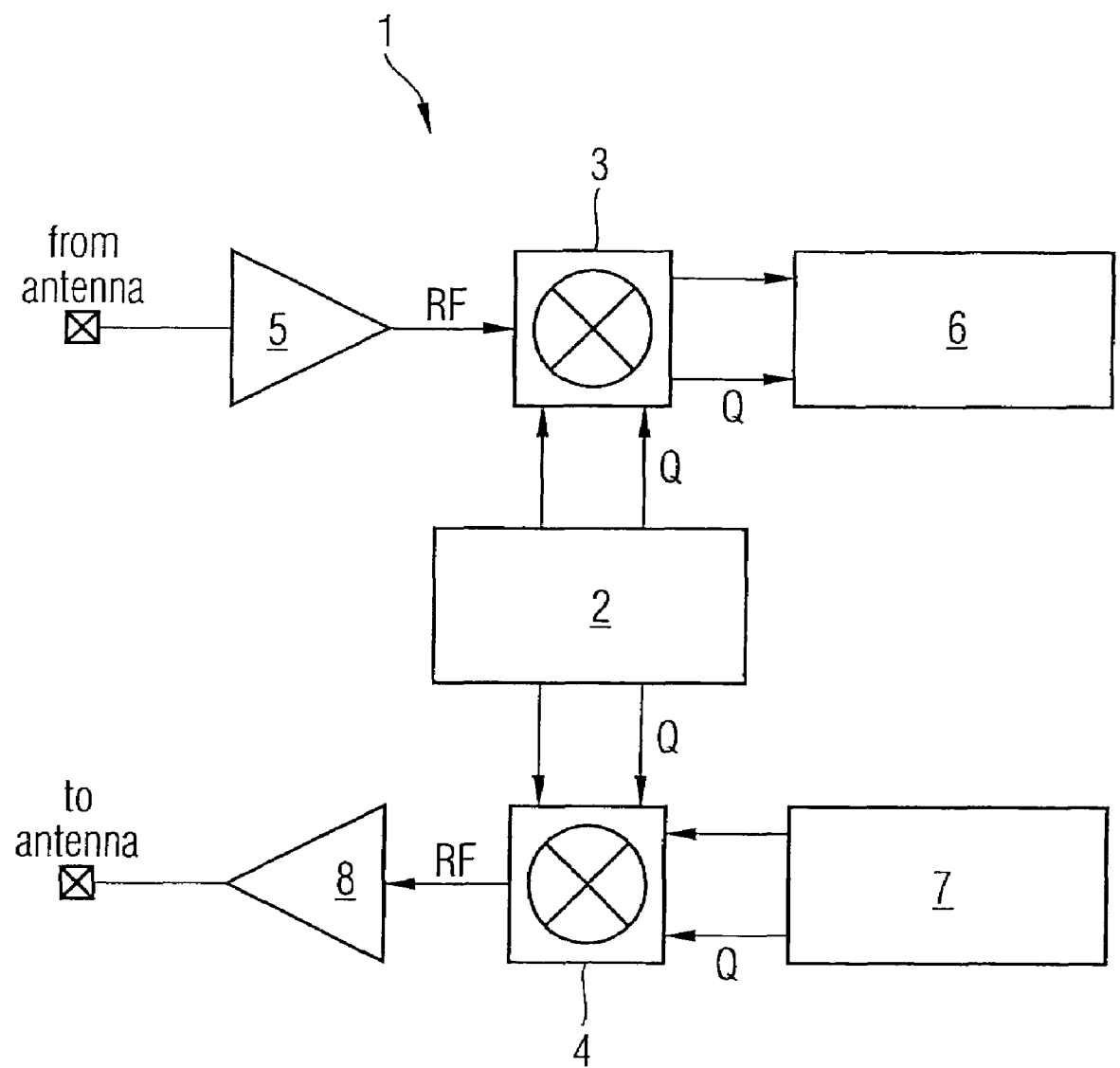
FIG. 1 is a schematic diagram illustrating a radio transceiver using a frequency synthesizer for generating a radio frequency.

One or more aspects and/or embodiments of the invention are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in block diagram form in order to facilitate describing one or more aspects of the embodiments of the invention. The following description is therefore not to be taken in a limiting sense, and the scope of the invention is defined by the appended claims.

Referring to FIG. 1, there is shown an example of a radio transceiver 1 using a frequency synthesizer 2 for generating a radio frequency signal. The radio frequency signal is used for up-converting baseband signals which are to be transmitted and for down-converting received radio frequency signals. The radio transceiver 1 shown in FIG. 1 in this example is based on a direct conversion concept, meaning that baseband signals are up-converted to a transmission frequency in a single operation and incoming radio frequency signals are down-converted to baseband without going to an intermediate frequency. Alternate types of frequency synthesizers, however, are contemplated by the present invention.

The frequency synthesizer 2 provides radio frequency signals in the form of complex signals having I (in-phase) and Q (quadrature) components. The I and Q components are applied to input terminals of mixers 3 and 4. Mixer 3 is arranged in a receiver path of the radio transceiver 1, and mixer 4 is arranged in a transmitter path.

The mixer 3 has a further input terminal which is coupled to the output terminal of an amplifier 5, which may be a low-noise amplifier. The amplifier 5 receives incoming signals from an antenna and after amplification the amplifier 5 feeds the mixer 3 with the received signals. The output terminals of the mixer 3 are connected to the input terminals of a baseband processing unit 6 which accomplishes further processing of the down-converted signals. In the transmitter path, the mixer 4 receives baseband signals from a baseband processing unit 7 and up-converts these signals to the transmission frequency before they pass through a power amplifier 8 and are transmitted via the antenna.

Figure 2:
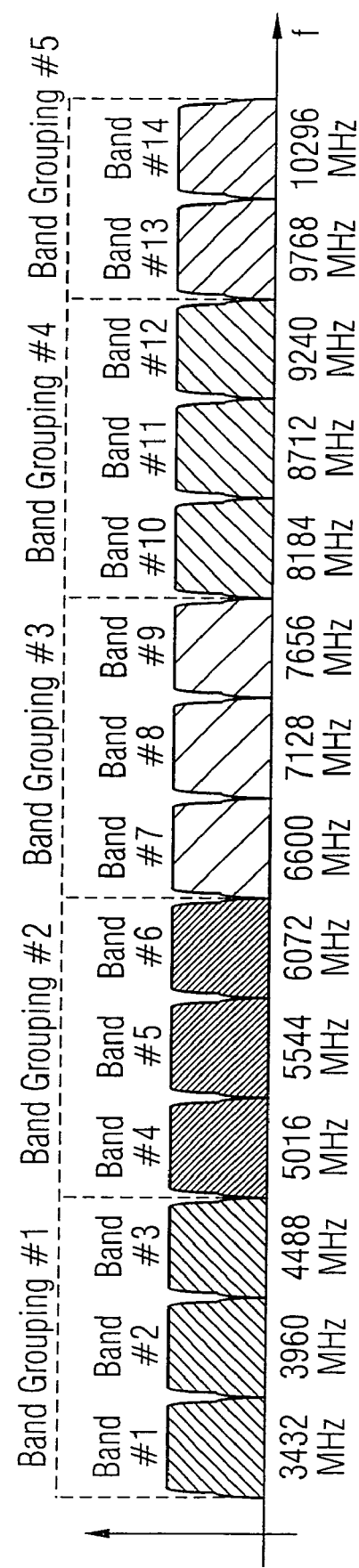
FIG. 2 is a graph illustrating the frequency allocation specified by the multi-band orthogonal frequency division multiplexing ultra-wideband (MB-OFDM UWB) standard.

In the present example, the purpose of the frequency synthesizer 2 is generation of the proper radio frequencies required by the multi-band OFDM ultra-wideband (MB-OFDM UWB) specification. The frequency allocation specified by the MB-OFDM UWB standard is shown in FIG. 2. According to this standard, a transmitter or receiver can operate inside one of the band groups 1 to 5. The signal level allowed by FCC (Federal Communications Commission) for the U.S.A. is −43.5 dBm/MHz. In Europe the possibility for band group 1 to use a mask with a limit of −70 dBm/MHz up to 4.2 MHz is under discussion.

Frequency synthesizers as shown in FIG. 1 usually comprise mixer circuits which multiply a higher reference frequency signal with a variable lower frequency signal. Such a mixer circuit is exemplarily shown in FIG. 3. A mixer 10, which may be a single-side band (SSB) mixer for example, obtains a reference frequency signal, for instance 4224 MHz, which may be generated by a phase-locked loop 11, and shifts the reference frequency by an offset of, for example, −264 MHz or +264 MHz or −792 MHz. In this manner, three frequencies needed to cover band group 1 of the MB-OFDM UWB standard can be obtained by adding or subtracting a variable lower frequency from a fixed reference frequency. The lower frequencies may be generated using a direct digital synthesizer 12 or a divider, for example. The switching of the lower frequency can be obtained very quickly, for example by switching an input look-up table of a digital-to-analog converter, as to allow fast frequency hopping required in the UWB system. The quadrature output signals of the SSB mixer 10 are used to directly up-convert baseband signals by means of an IQ modulator 13.

Figure 3:
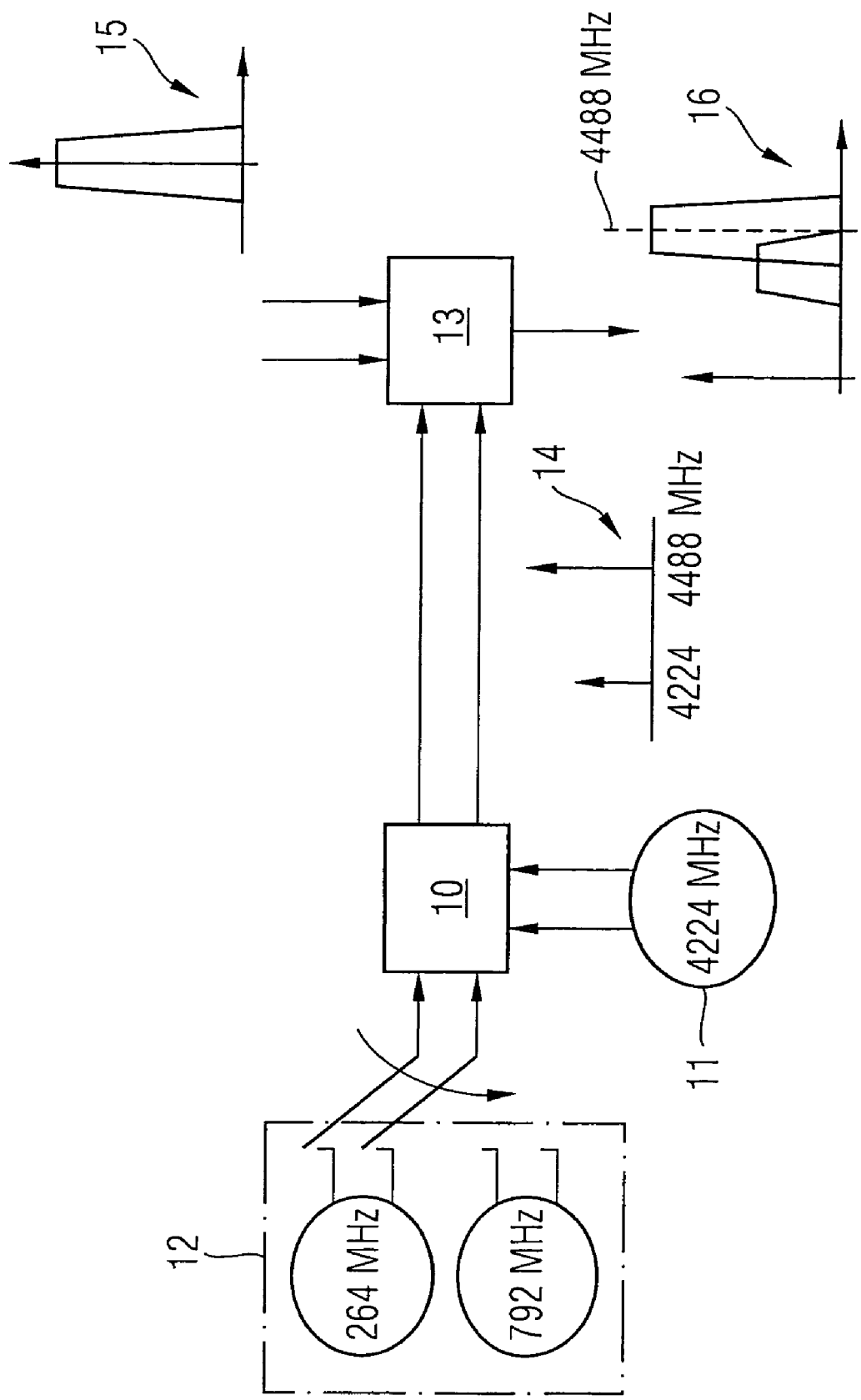
FIG. 3 is a schematic diagram illustrating the effects of mixer leakage within the frequency synthesizer.

Mixer circuits such as shown in FIG. 3 may exhibit mixer leakage. Mixer leakage occurs, for example, when a portion of the reference frequency signal of 4224 MHz, which is applied to the SSB mixer 10, appears at the output terminal of the SSB mixer 10 without being mixed with the lower frequency. Two resulting output signal components of the SSB mixer 10 are shown at reference numeral 14 in FIG. 3. The output signal component at 4488 MHz is due to the mixing of 4224 MHz with +264 MHz, whereas the output signal component at 4224 MHz is the leakage signal leaking to the output terminal of the SSB mixer 10. The effect of the mixer leakage is an unwanted replica thereof in the output spectrum of the IQ modulator 13. Reference numeral 15 shows the baseband input spectrum of the IQ modulator 13. The IQ modulator 13 shifts this spectrum to 4488 MHz, but also creates a leakage spectrum at 4224 MHz which is due to the leakage of the SSB mixer 10. Both spectra are shown at reference numeral 16.

The leakage spectrum shown in reference numeral 16 may fall outside the emission mask which is under discussion for Europe. In order to fulfill the European requirements the mixer leakage must be well below −35 dBc. Furthermore, the leakage spectrum cannot be removed by an external filter since it is located in the middle of the allowed spectrum for band group 1 for the U.S.A. and a world-wide usable implementation is desirable.

Figure 4:
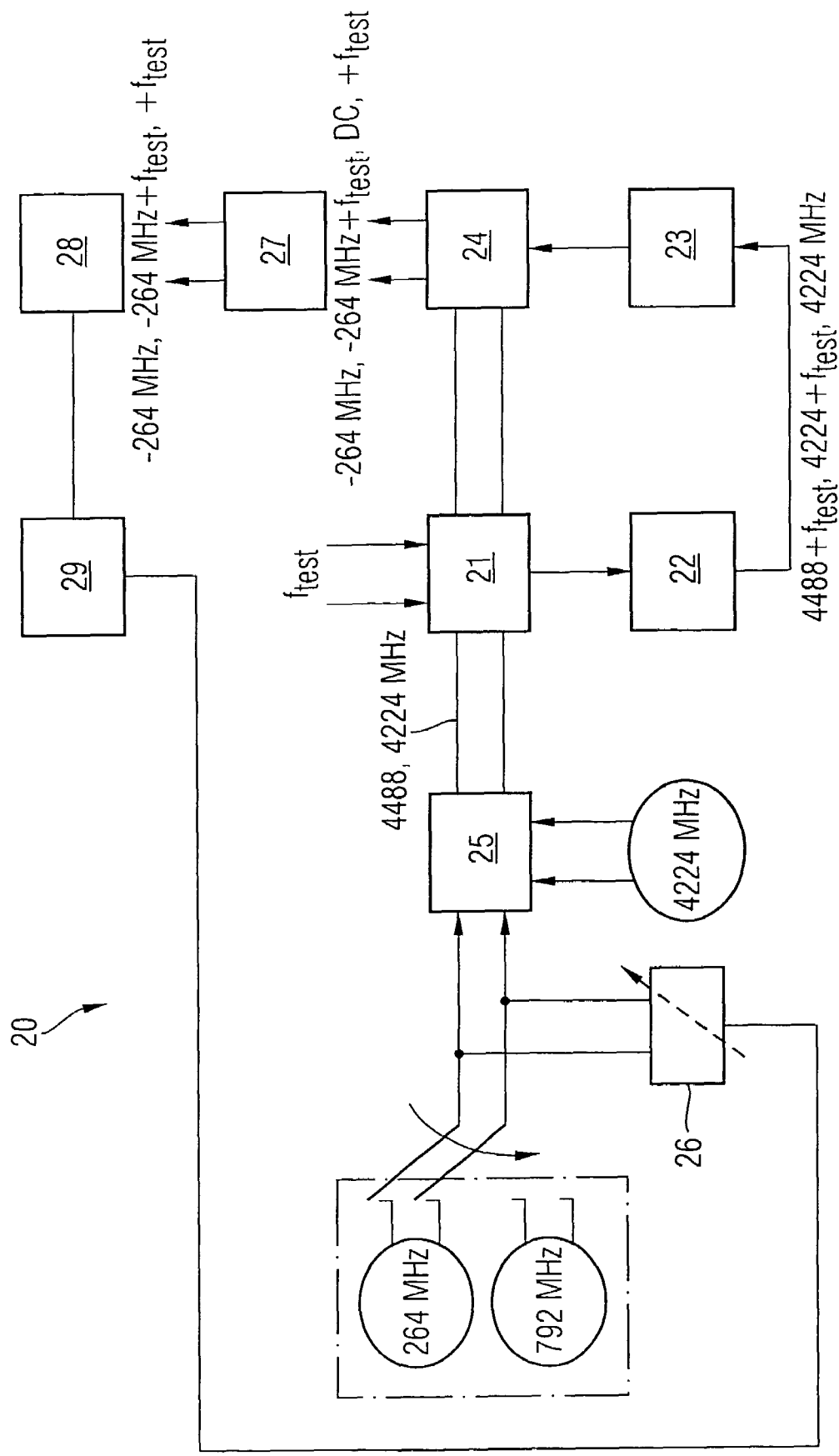
FIG. 4 is a schematic diagram illustrating a radio transceiver as an exemplary embodiment of the invention.

Referring to FIG. 4, a block diagram of a radio transceiver 20 is shown comprising an apparatus for reducing or eliminating effects of mixer leakage. The circuit shown in FIG. 4 serves as an exemplary embodiment of the invention.

The transceiver 20 comprises a transmitter path with an IQ modulator 21 and a power amplifier 22 as well as a receiver path with an amplifier 23, which may be a low-noise amplifier, and an IQ demodulator 24. Furthermore a mixing circuit 25 as shown in FIG. 3 is employed to create a local oscillator signal. The local oscillator signal is applied to the local oscillator terminals of the IQ modulator 21 and the IQ demodulator 24. Alternatively, the local oscillator signal for the IQ demodulator 24 could be provided by an additional mixing circuit which may be separate from and/or different to the one shown in FIG. 4. The IQ modulator 21 uses the local oscillator signal to up-convert signals to a higher frequency, the IQ demodulator 24 down-converts signals from a higher frequency to a lower frequency, in particular to baseband.

The mixing circuit shown in FIG. 4 includes an SSB mixer 25 which suffers from mixer leakage. Therefore, beside the wanted signal of, for example, 4488 MHz a spurious signal may appear at the output terminal of the SSB mixer at 4224 MHz which is due to mixer leakage. According to one embodiment of the invention, the leakage signal at 4224 MHz can be reduced or eliminated by adding a complex constant to the input signal of the SSB mixer 25. For this purpose a digital-to-analog converter 26 is provided. The output terminals of the digital-to-analog converter 26 are connected to the baseband input terminals of the SSB mixer 25 so that a complex constant is added to the input signal. When the proper complex constant is up-converted by the SSB mixer 25, the sinusoidal signal compensates for the leakage signal occurring at the output terminal of the SSB mixer 25. This is the case if the sinusoidal signal resulting from the complex constant has opposite phase and same amplitude of the leakage signal.

The appropriate constant to be generated by the digital-to-analog converter 26 is chosen by means of a DC removal circuit 27, a signal detector 28 and a control circuit 29. The DC removal circuit 27 and the signal detector 28 are arranged in series and downstream of the IQ demodulator 24. The control circuit 29 is coupled to an output terminal of the signal detector 28 and an input terminal of the digital-to-analog converter 26. Furthermore, the output terminal of the power amplifier 22 is connected to the input terminal of the amplifier 23. Alternatively, for instance, the output terminal of the IQ modulator 21 may be connected to the input terminal of the IQ demodulator 24.

The function of the apparatus for reducing or eliminating the effects of mixer leakage for one embodiment is described in the following. A signal of a given frequency $f_{test}$, which also could be 0 Hz, is fed to the input terminals of the IQ modulator 21. The signal of the frequency $f_{test}$ is up-converted by the IQ modulator 21. As an example, a wanted local oscillator frequency of 4488 MHz is chosen. At the output of the IQ modulator 21 three signal components of different frequencies occur: A signal with a frequency of 4488 MHz+$f_{test}$ is due to the normal operation of the SSB mixer 25 and the IQ modulator 21. A signal with a frequency of 4224 MHz+$f_{test}$ is caused by the mixer leakage. A third signal with a frequency of 4224 MHz is another unwanted spurious signal which leaks from the generator of the reference frequency of 4224 MHz directly to the output terminal of the IQ modulator 21. The signals occurring at the output terminal of the IQ modulator 21 are looped back to the receiver path of the radio transceiver 20 via the connection between the power amplifier 22 and the amplifier 23. Different loop back paths could also be used, for example as mentioned above, a direct connection between the IQ modulator 21 and the IQ demodulator 24.

In the receiver path, the local oscillator terminal of the IQ demodulator 24 is driven by the same local oscillator signal used in the transmitter path. After the down-conversion several signals can be observed at the output terminal of the IQ demodulator 24: A signal with a frequency of +$f_{test}$ is due to the normal operation of the IQ modulator 21 and the IQ demodulator 24. A signal with a frequency of −264 MHz+$f_{test}$ is proportional to the amplitude of the leakage signal which is aimed to be reduced or eliminated. A signal with a frequency of −264 MHz is due to the direct leakage at the output terminal of the IQ modulator 21. Furthermore, a DC signal occurs at the output terminal of the IQ demodulator 24 which is due to a DC offset and self-mixing of the IQ demodulator 24.

The DC signal is removed by the DC removal circuit 27. This can be achieved by AC coupling or a DC offset reduction circuit which is usually present in a direct conversion receiver structure.

The signal detector 28 is implemented to measure the spurious signal at a frequency of −264 MHz+$f_{test}$. Since this signal is indicative of the leakage signal, this measurement arrangement enables the measurement of the leakage signal and also enables the determination of the proper constant which needs to be applied to the baseband input terminals of the SSB mixer 25 in order to eliminate or at least reduce the spurious signals which are caused by the mixer leakage. The control circuit 29 accomplishes this task by monitoring the amplitude of the signal detected by the signal detector 28 and adjusting the complex constant output by the digital-to-analog converter 26 accordingly. It is sufficient to try different constants until the minimum power for the detected signal is reached.

A feature of the radio transceiver 20 shown in FIG. 4 is that it enables reduction of the leakage of the SSB mixer 25 well below −35 dBc, thus fulfilling the European mask requirement.

Although in FIG. 4 the receiver path of the radio transceiver 20 is utilized to down-convert the output signals of the IQ modulator 21, it is also possible to employ an additional IQ demodulator for the same task.

During normal use of the radio transceiver 20, the loopback connection between the transmitter and receiver paths is disconnected and the radio transceiver 20 is used in the manner described above with regard to the radio transceiver 1 shown in FIG. 1.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise." The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments of the invention may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

What is claimed is:

1. A mixer circuit, comprising:
    a frequency mixer, having input terminals and an output terminal, configured to provide an output signal by mixing input signals provided at the input terminals, wherein the frequency mixer exhibits a leakage from one of the input terminals into the output terminal;
    a signal generator coupled to one of the input terminals of the frequency mixer, and configured to generate and provide a correction signal thereto;
    an up-conversion mixer coupled to the frequency mixer, and configured to generate an up-converted signal by mixing a test signal with the output signal of the frequency mixer;
    a down-conversion mixer coupled to the up-conversion mixer, and configured to generate a down-converted signal by down-converting the up-converted signal;
    a signal detector coupled to the down-conversion mixer, and configured to detect a spurious signal in the down-converted signal, the spurious signal indicating the leakage; and
    a control unit coupled to the signal detector and the signal generator, and configured to control generation of the correction signal depending on the detected spurious signal to compensate for the leakage.

2. The mixer circuit of claim 1, further comprising a DC removal circuit, arranged between the down-conversion mixer and the signal detector, and configured to remove a DC signal from the down-converted signal.

3. The mixer circuit of claim 1, wherein the spurious signal occurs at a pre-determined frequency.

4. The mixer circuit of claim 1, wherein the signal generator comprises a digital-to-analog converter configured to produce the correction signal.

5. The mixer circuit of claim 1, wherein the up-conversion mixer, when not up-converting the test signal, is configured to up-convert signals that are to be transmitted as radio frequency signals.

6. A method for reducing or eliminating the effects of mixer leakage, comprising:
    mixing input signals to generate an output signal using a frequency mixer, wherein the output signal exhibits a leakage component associated with the frequency mixer;
    producing a correction signal and applying the correction signal to the frequency mixer in addition to the input signals;
    up-converting a test signal by mixing it with the output signal of the frequency mixer;
    down-converting the up-converted signal;
    detecting a spurious signal in the down-converted signal that is due to a leakage component of the frequency mixer; and
    selecting the correction signal to reduce or eliminate the leakage signal.

7. The method of claim 6, further comprising removing a DC signal from the down-converted signal.

8. A mixer circuit, comprising:
    a frequency mixer configured to mix input signals and generate an output signal;
    a signal generator configured to produce a correction signal and provide the correction signal to the frequency mixer for addition to the input signals;
    an up-conversion mixer configured to up-convert a test signal by mixing it with the output signal of the frequency mixer to form an up-converted signal;
    a down-conversion mixer configured to down-convert the up-converted output signal of the up-conversion mixer;
    a signal detector configured to detect a spurious signal in the output signal of the down-conversion mixer; and
    a control unit, coupled to the signal generator and the signal detector, configured to control the signal generator to reduce or eliminate the spurious signal.

9. The mixer circuit of claim 8, further comprising a DC removal circuit, arranged between the down-conversion mixer and the signal detector, configured to remove a DC signal from the output signal of the down-conversion mixer.

10. The mixer circuit of claim 8, wherein the spurious signal occurs at a pre-determined frequency.

11. The mixer circuit of claim 8, wherein the signal generator comprises a digital-to-analog converter configured to produce a constant signal used as the correction signal.

12. The mixer circuit of claim 8, wherein the up-conversion mixer, when not up-converting the test signal, is configured to up-convert signals that are to be transmitted as radio frequency signals.

13. A method for reducing or eliminating a spurious signal, comprising:
   mixing input signals to generate an output signal by using a frequency mixer;
   producing a correction signal and applying the correction signal to the frequency mixer in addition to the input signals;
   up-converting a test signal by mixing it with the output signal of the frequency mixer;
   down-converting the up-converted signal;
   detecting a spurious signal in the down-converted signal; and
   selecting the correction signal to reduce or eliminate the spurious signal.

14. The method of claim 13, further comprising removing a DC signal from the down-converted signal.

15. A radio transmitter comprising:
   a signal generator configured to generate a correction signal;
   a frequency synthesizer configured to generate a local oscillator frequency signal by mixing a first frequency signal, to which the correction signal is added, with a second frequency signal;
   an up-conversion mixer configured to up-convert a test signal by mixing it with the local oscillator frequency signal;
   a down-conversion mixer configured to down-convert the output signal of the up-conversion mixer;
   a signal detector configured to detect a spurious signal in the output signal of the down-conversion mixer; and
   control means, coupled to the signal generator and the signal detector, and operable to control the signal generator to reduce or eliminate the spurious signal detected by the signal detector.

16. The radio transmitter of claim 15, wherein the spurious signal in the output signal of the down-conversion mixer is due to a mixer leakage in the frequency synthesizer.

17. The radio transmitter of claim 15, wherein the down-conversion mixer is configured to use the local oscillator frequency signal to down-convert the output signal of the up-conversion mixer.

18. The radio transmitter of claim 15, wherein the up-conversion mixer is also configured to perform direct conversion of signals to be transmitted by the radio transmitter.

19. The radio transmitter of claim 15, further comprising:
   a radio frequency signal receiving circuit, which comprises the down-conversion mixer, wherein the down-conversion mixer is also configured to perform down-converting received radio signals.

20. The radio transmitter of claim 15, wherein the output of the up-conversion mixer is connected to the input of a power amplifier and the output of the power amplifier is configured to at least temporarily connect to the input of a low-noise amplifier, and the output of the low-noise amplifier is configured to connect to the input of the down-conversion mixer.

21. In a radio transmitter, a method comprising:
   producing a correction signal;
   producing a local oscillator frequency signal by mixing a first frequency signal, to which the correction signal is added, with a second frequency signal;
   up-converting a test signal by mixing it with the local oscillator frequency signal;
   down-converting the up-converted signal;
   detecting a spurious signal in the down-converted signal; and
   selecting the correction signal to reduce or eliminate the detected spurious signal.

22. The method of claim 21, wherein the spurious signal is due to a leakage of a mixer producing the local oscillator frequency signal.

23. The method of claim 21, wherein the local oscillator frequency signal is configured to down-convert the up-converted signal.

24. The method of claim 21, wherein the radio transmitter comprises an up-conversion mixer, which up-converts the test signal and up-converts signals to be transmitted by the radio transmitter.

25. The method of claim 21, wherein the radio transmitter comprises a down-conversion mixer configured to down-convert the up-converted signal and down-convert received radio frequency signals.

* * * * *